US012558975B2

(12) United States Patent
Karlsson et al.

(10) Patent No.: US 12,558,975 B2
(45) Date of Patent: Feb. 24, 2026

(54) STRUCTURAL BATTERY COMPRISING COOLING CHANNELS

(71) Applicant: Volvo Car Corporation, Gothenburg (SE)

(72) Inventors: Daniel Karlsson, Gothenburg (SE); Martin Hjälm Wallborg, Harestad (SE); Simone Vizzini, Gothenburg (SE); Klas Persson, Kungälv (SE)

(73) Assignee: Volvo Car Corporation, Gothenburg (SE)

( * ) Notice: Subject to any disclaimer, the term of this patent is extended or adjusted under 35 U.S.C. 154(b) by 799 days.

(21) Appl. No.: 17/861,656

(22) Filed: Jul. 11, 2022

(65) Prior Publication Data

US 2023/0017474 A1     Jan. 19, 2023

(30) Foreign Application Priority Data

Jul. 16, 2021     (EP) ..................................... 21186238

(51) Int. Cl.
H01M 10/613 (2014.01)
B60K 1/04 (2019.01)
(Continued)

(52) U.S. Cl.
CPC ............... B60L 50/66 (2019.02); B60K 1/04 (2013.01); B60L 50/64 (2019.02);
(Continued)

(58) Field of Classification Search
CPC ........ B60L 50/66; B60L 50/64; B60L 3/0007; B60K 1/04; B60K 2001/005;
(Continued)

(56) References Cited

U.S. PATENT DOCUMENTS 9,533,600 B1 * 1/2017 Schwab .............. H01M 10/613
9,819,062 B2 * 11/2017 Mascianica ......... H01M 10/625
(Continued)

FOREIGN PATENT DOCUMENTS

CN       109515216 A      3/2019
CN       111934052 A   * 11/2020

OTHER PUBLICATIONS

Machine translation of CN-111934052-A.*
Dec. 15, 2021 European Search Report issued in International Application No. 21186238.

*Primary Examiner* — Matthew T Martin
*Assistant Examiner* — Felicity B Alban
(74) *Attorney, Agent, or Firm* — Clements Bernard Walker; Christopher L. Bernard

(57)     ABSTRACT

A battery assembly for an electric vehicle includes two spaced-apart longitudinal profiles extending in a length direction L, interconnected to a front and a rear transverse beam. At least three beam shaped battery modules are interconnected along their longitudinal sides via a plate-shaped interconnecting member, and extend in the length direction, to be attached to an inner surface of the front transverse beam via a bracket. Each battery module is provided with cooling channels extending in the length direction L and having an inlet situated between a transverse end face of the module and the inner surface of the front transverse beam. A water inlet duct extends from an external side the front transverse beam in a central area situated between the brackets, for connecting to a coolant inlet of the central battery module.

15 Claims, 6 Drawing Sheets

(51) Int. Cl.

| | |
|---|---|
| *B60L 50/60* | (2019.01) |
| *B60L 50/64* | (2019.01) |
| *H01M 10/625* | (2014.01) |
| *H01M 10/6554* | (2014.01) |
| *H01M 10/6556* | (2014.01) |
| *H01M 50/204* | (2021.01) |
| *H01M 50/249* | (2021.01) |
| *H01M 50/264* | (2021.01) |
| *B60K 1/00* | (2006.01) |
| *B62D 25/20* | (2006.01) |

(52) U.S. Cl.

CPC ....... *H01M 10/613* (2015.04); *H01M 10/625* (2015.04); *H01M 10/6554* (2015.04); *H01M 10/6556* (2015.04); *H01M 50/204* (2021.01); *H01M 50/249* (2021.01); *H01M 50/264* (2021.01); *B60K 2001/005* (2013.01); *B60K 2001/0438* (2013.01); *B62D 25/2009* (2013.01); *H01M 2220/20* (2013.01)

(58) Field of Classification Search

CPC ........ B60K 2001/0438; H01M 10/613; H01M 10/625; H01M 10/6554; H01M 10/6556; H01M 50/204; H01M 50/249; H01M 50/264; H01M 2220/20; H01M 50/209; H01M 50/211; H01M 10/6568; H01M 50/14; H01M 50/224; H01M 50/289; B62D 25/2009; Y02E 60/10

See application file for complete search history.

(56) References Cited

U.S. PATENT DOCUMENTS

| | | | |
|---|---|---|---|
| 9,937,781 B1 | 4/2018 | Bryer et al. | |
| 10,559,795 B1* | 2/2020 | Madasamy | ......... H01M 50/244 |
| 2015/0276328 A1* | 10/2015 | Huang | .................... B23P 15/26 |
| | | | 29/890.03 |
| 2019/0326573 A1* | 10/2019 | Ozawa | ................ B62D 21/157 |
| 2021/0028422 A1 | 1/2021 | Kim et al. | |
| 2021/0146763 A1* | 5/2021 | Shin | ........................ B60L 50/66 |
| 2021/0175572 A1 | 6/2021 | He et al. | |

* cited by examiner

STRUCTURAL BATTERY COMPRISING COOLING CHANNELS

CROSS-REFERENCE TO RELATED APPLICATION

The present disclosure claims the benefit of priority of co-pending European Patent Application No. 21186238.8, filed on Jul. 16, 2021, and entitled "Structural Battery Comprising Cooling Channels," the contents of which are incorporated in full by reference herein.

TECHNICAL FIELD

The disclosure relates to a battery assembly for an electric vehicle including two spaced-apart longitudinal profiles extending in a length direction, interconnected to a front and a rear transverse beam. The disclosure also relates to an electric vehicle including such a battery assembly.

BACKGROUND

Electrical vehicles (also known as Battery Electric Vehicles, BEVs in short) use a battery pack to provide electricity to the drive train/motor(s). To provide enough range with current cell technology, in line with customer expectations coming from a fossil fuel car, a BEV battery is located underneath the passenger compartment, basically under the floor. The overall design complexity involves maximizing cell volume (range) into a given footprint (area/volume) provided by the car setup, to the lowest weight possible (range/environmental impact) while also maximizing highly important attributes such as crash safety and vehicle stiffness (NVH and driver experience).

Up until recently, a battery electric vehicle pack has been as a standalone unit with a main function being a safety cage for battery cells and modules, preventing intrusion that causes major failure, while also protecting the sensitive electronics inside the pack from the outside environment. This thinking has led to double structures, battery and body of the vehicle. Having double structures with the necessary gaps to allow for tolerances and general assembly, occupies a volume that could have otherwise been used for integrating more cell volume, further increasing range, had the two systems been seen and engineered as one system. Current art is compensating for this lower volumetric efficiency by using a larger footprint, leading to a shorter stopping distance (in longitudinal and lateral direction) between frame structure and cell footprint. An increasing size of the vehicle results in in increased energy content.

It is known to provide a structural battery in which the battery casing forms the bottom of the vehicle body and the traditional front floor is removed. The arrays of battery cells are kept in place inside a protective casing by means of a resin.

The battery pack is a highly integrated unit with a lot of different components fighting for volume (space). Generally speaking, in electric vehicle technology, cells and structure are top priority since the first provide the energy needed (range) and the second relates to safety and installation features. In tight order follows cooling system and electrical components of various kinds, also very important for connecting all the cells, control power output and monitoring battery health. At present a battery pack, containing current technology and state-of-the-art cells, will not work without an active cooling system that involves cooling circuits in contact with the battery cells where a fluid is circulated.

One major design challenge is how to integrate a highly-efficient cooling system into a pack without compromising too much with cell volume or structural integrity, as that leads to lower energy content or increased structural weight to compensate for weak sections and/or joints. The current art solves this in one embodiment by routing the cooling ducts outside battery pack. This solution however compromises too much on Noise, Vibration and Harshness (NVH) performance. Another option is to provide a simpler internal battery pack structure where pass-through of the cooling ducts is easier. This however translates into a weaker battery pack that and is compensated by an increase in battery volume or body volume, resulting in an increase in weight.

It is an object of the disclosure to provide a compact and torsionally stiff battery pack with an efficient and well-shielded cooling system. It is a further object of the disclosure to provide a battery pack that gives a good NVH performance to the user of the electric vehicle that is powered by the battery pack. It is again an object of the disclosure to provide a cooled structural battery assembly that can be rigidly attached to a front frame structure of an electric vehicle.

SUMMARY

A battery assembly for an electric vehicle according to the application includes two spaced-apart longitudinal profiles extending in a length direction, interconnected to a front and a rear transverse beam, at least three beam shaped battery modules, interconnected along their longitudinal sides via a plate-shaped interconnecting member, the interconnecting members extending in the length direction and being attached to an inner surface of the front transverse beam via a bracket, each battery module including cooling channels extending it the length direction and having an inlet situated between a transverse end face of the module and the inner surface of the front transverse beam, a water inlet duct extending from an external side the front transverse beam in a central area situated between the brackets, to connect to an inlet of the central battery module, a connecting area on the external side of the front transverse beam for attaching to a front frame part being situated adjacent to the central area, opposite the brackets, and a branching duct extending between a front transverse side of the central module to an inlet between the transverse end face of the side modules and the front transverse beam via a channel through the bracket.

The battery modules, that each may contain 30-50 battery cells, are interconnected along their longitudinal sides via the interconnecting members. The connection of the cells to the interconnecting members may be an adhesive connection or via a matrix structure. The interconnecting members are rigidly connected to the front and rear transverse beams that are attached to the longitudinal sill profiles, via the brackets. The brackets at the inner surface of the front transverse beam provide rigid connection areas to which the front frame structure may attached via the outer surface of the front transverse beam.

The structural battery is firmly fixed to the front frame part via the brackets to result in a rigid structure with improved NVH properties, while the cooling manifold is accommodated between the transverse sides of the battery modules and the inner side of the front transverse beam. This provides a good protection of the duct from mechanical forces and does not give rise to an in increase of the footprint of the structural battery. The cooling channel is formed in the bracket material and forms at the position of the bracket a short, light-weight and well shielded path for the cooling liquid when it travels from the main inlet to the cooling channels in the upper and/or lower cooling plates of the outer battery modules. As the cooling ducts and the channel section within the bracket are situated within the perimeter of the front transverse bream and the longitudinal sill profiles, they are well protected against impacts by respectively the front transverse beam and the bracket and the profiles.

The cooling channel within the bracket may be integrally formed in the material of the bracket by casting or machining.

The brackets may be of substantially triangular cross-section with two rectangular side faces adjacent the interconnecting member and the front transverse beam and a slanting face, defining an upper and a lower transverse surface, the channel extending in a transverse plane attached to the side faces and the slanting face situated between the upper and lower transverse surfaces. The transverse plane of the channel forms a shear plane that reinforces the bracket structure, allowing the bracket to be of reduced thickness and weight.

In an embodiment according to the application, the bracket is in the side face that faces the transverse beam provided with connecting passages for receiving connector pins of a front frame part, extending through the front transverse beam.

The interconnecting member may at its front end be provided with a pass-through opening for the coolant channel, and attached via connector members extending through the member, through passages in the side face of the bracket facing the interconnecting member. An electric vehicle according to the disclosure includes a battery assembly as described in any of claims 1 to 5 of the present application.

BRIEF DESCRIPTION OF THE DRAWINGS

An embodiment of a battery pack according to the disclosure will, by way of non-limiting example, be described in detail with reference to the accompanying drawings. In the drawings.

DESCRIPTION OF EMBODIMENTS

Figure 1:
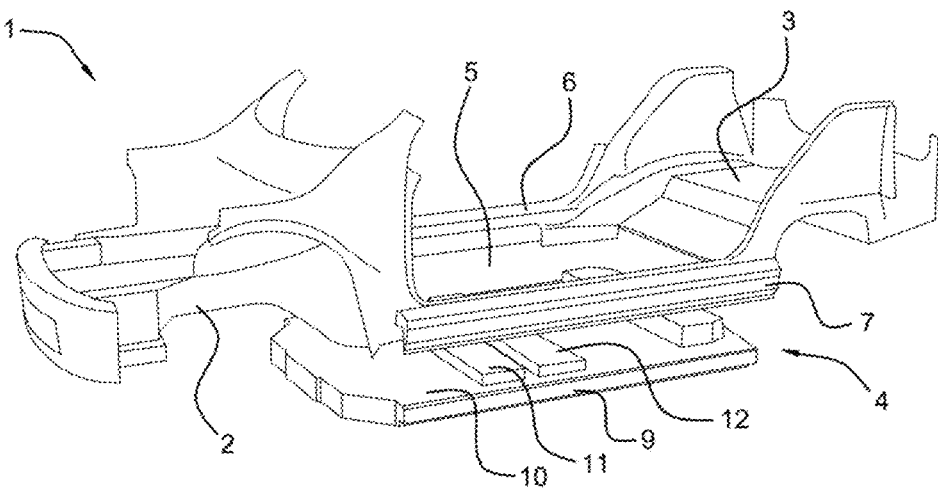
FIG. 1 shows the frame and a battery pack of an electric vehicle according to the application.

FIG. 1 shows a frame 1 of an electric vehicle including a front frame structure 2, a rear frame structure 3, including a rear floor, and a structural battery assembly 4 forming a bottom structure 5. The structural battery assembly 4 includes longitudinal side profiles 6,7 interconnecting the front and rear frame structures 2,3 and supporting a battery pack 9 of interconnected battery modules. Cross beams 11,12 are connected, for instance via spot welding, to a top plate 10 of the battery pack 9 and extend in a transverse direction, interconnecting the side profiles 6,7.

Figure 2:
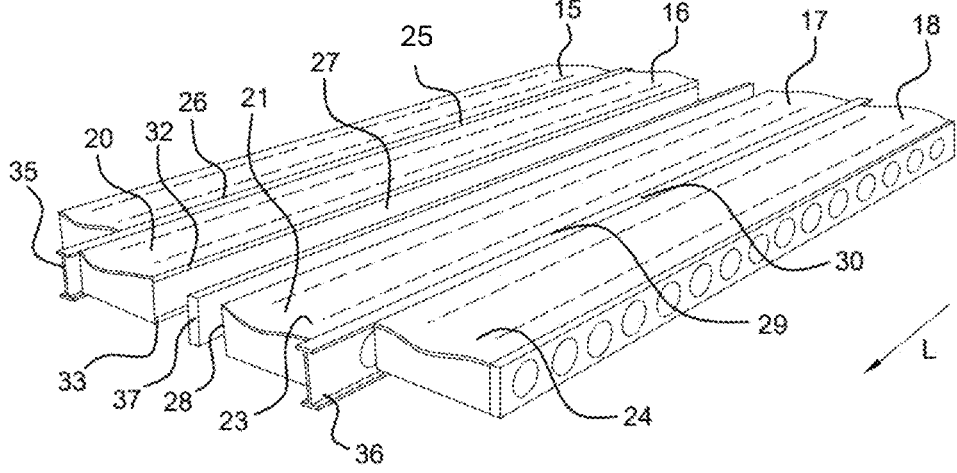
FIG. 2 shows a perspective view of interconnected battery modules of a battery pack according to the disclosure.

FIG. 2 shows four interconnected battery modules 15,16, 17,18 in an expanded view. Each module includes a number of interconnected battery cells that are covered by a cooling plate 20, 21. Each cooling plate 20,21 is provided with cooling channels 23,24 extending in a length direction L. The modules 15-18 are interconnected along their longitudinal sides 25, 26,27,28,29, 30 via strips of adhesive 32,33.

Interconnecting members 35,36 are provided along the longitudinal sides 25, 26, 29,30 of the battery modules 15-18, to which sides the adhesive is applied. An extruded hollow center profile 37 is on each side adhesively connected to two modules 15,16; 17,18.

Figure 3:
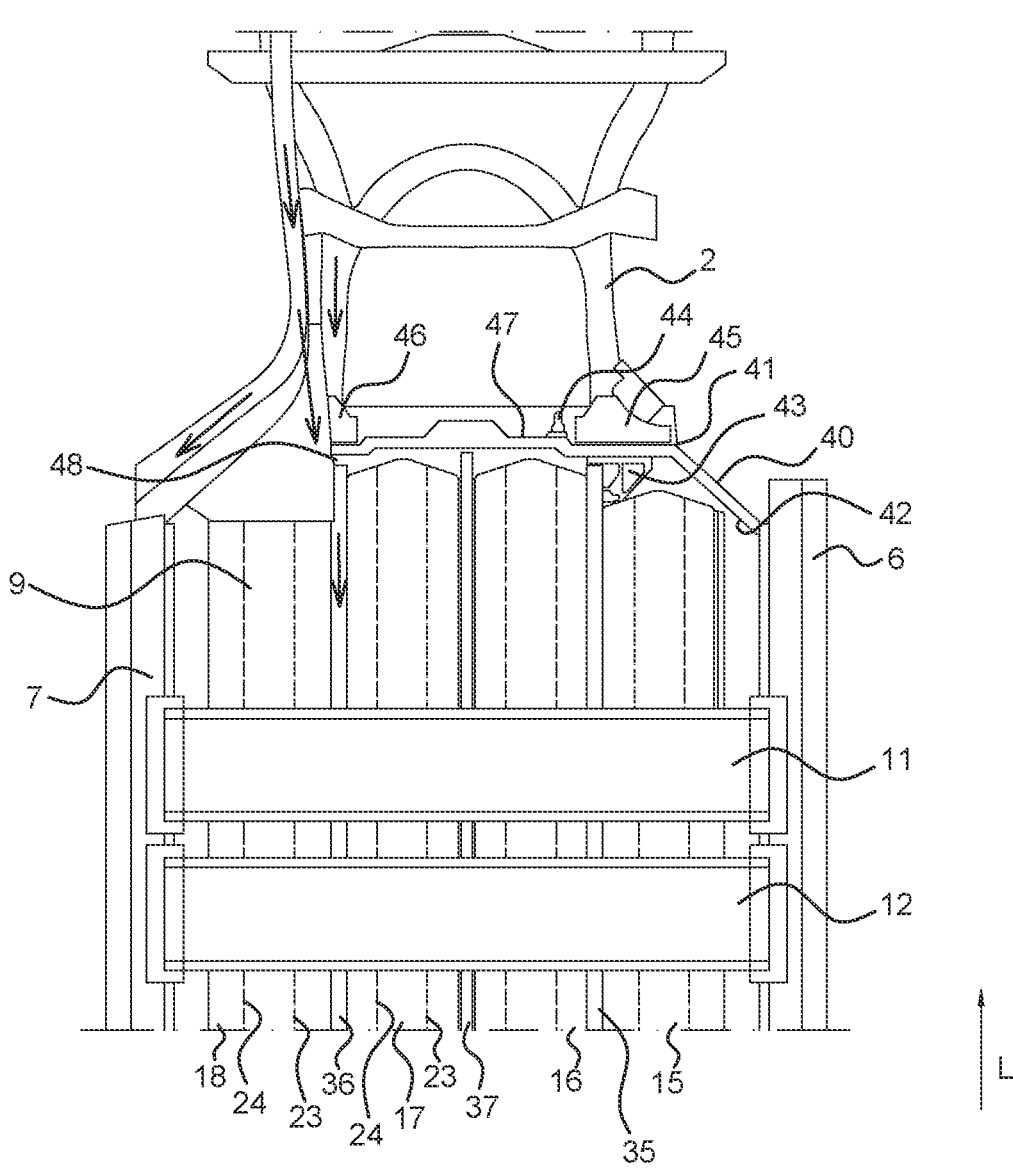
FIG. 3 shows a top view of a battery pack according to the disclosure, connected to a front frame structure.

FIG. 3 shows a top view of the battery pack 9 of FIG. 1, with the top plate 10 removed. The longitudinal side profiles 6,7 are connected to a front transverse beam 40. The interconnecting members 35,36 are connected via brackets 43,48 to an inner surface 42 the front transverse beam 40. The front frame structure 2 is attached via brackets 45,46, defining connecting area's on an outside surface 47 of the front transverse beam 40 for connection to the front frame structure 2. Via a coolant inlet nozzle 44, situated in a central area of the front transverse beam 40 between the brackets 43,48 and 45, 46, coolant is supplied to the cooling channels 23,24 of the modules 15-18.

Figure 4:
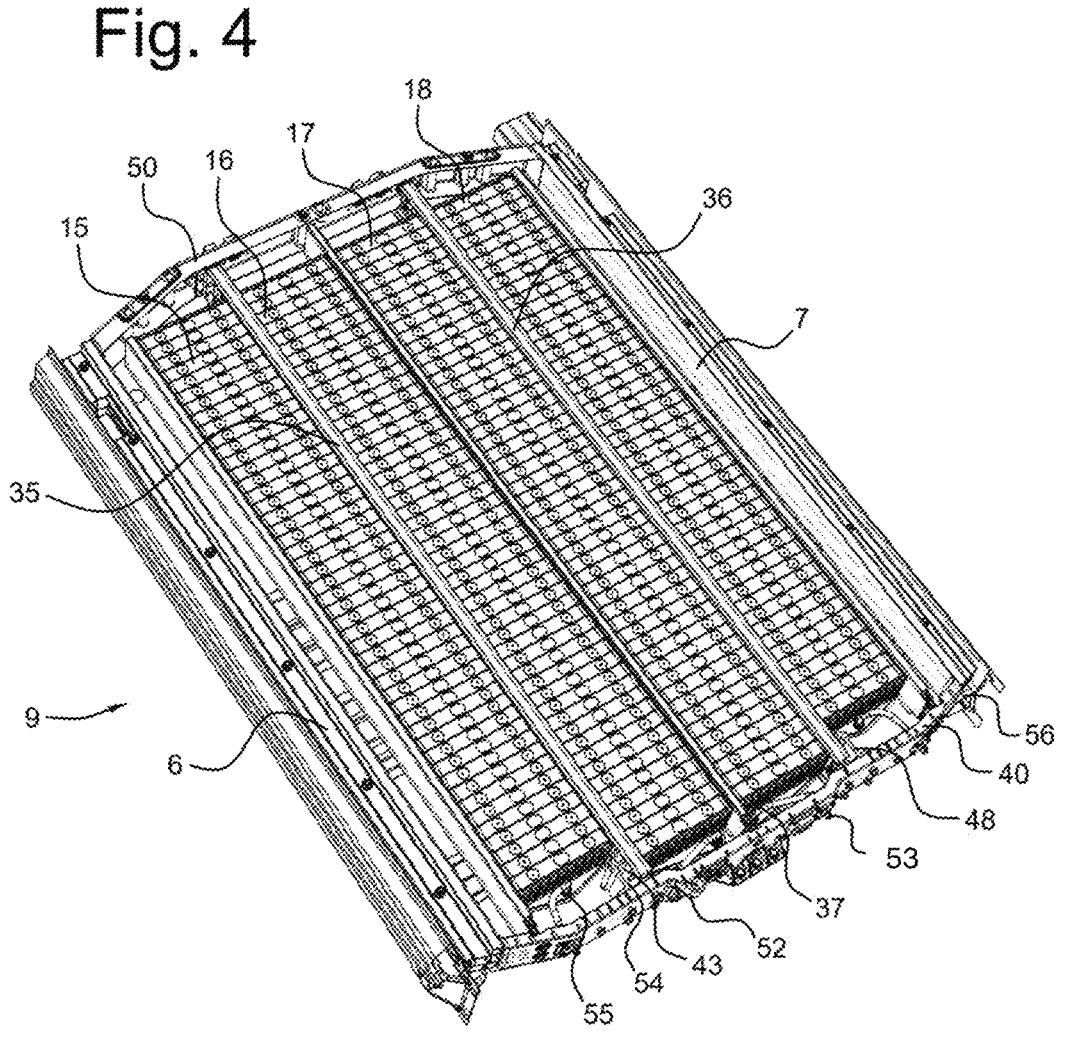
FIG. 4 shows a perspective view of a battery pack according to the disclosure with the top cooling plates removed.

FIG. 4 shows the battery pack 9 with the cooling plates 20,21 removed and shows the rear transverse beam 50 to which the interconnecting members 35, 36 and the center profile 37 are connected. An outlet manifold for the coolant is proved at the rear transverse beam 50. The individual battery cells of the modules 15-18 are shown. It can be seen that two coolant inlets 52, 53 are provided, extending through the front transverse beam 40, and extend via a branching duct in a transverse direction to connect to cooling fluid inlets 55, 56 of outer modules 15,18.

Figure 5:
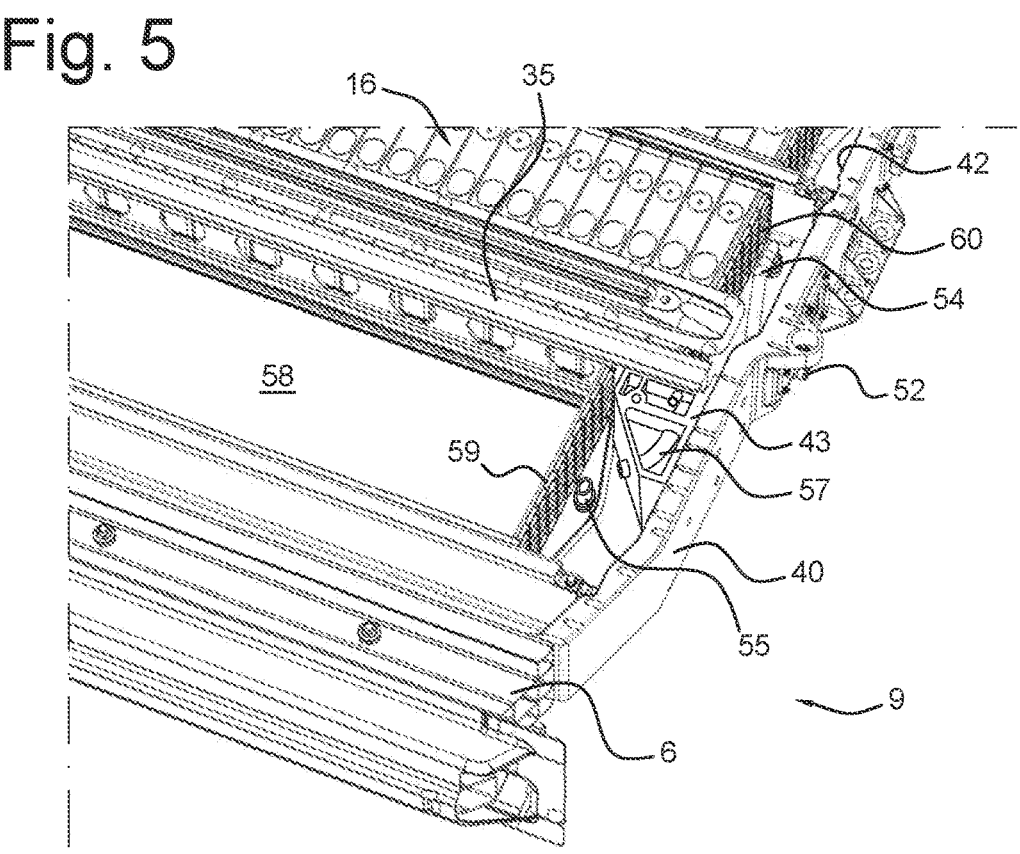
FIG. 5 shows a detail of the battery pack of FIG. 4 on an enlarged scale.
Figure 6:
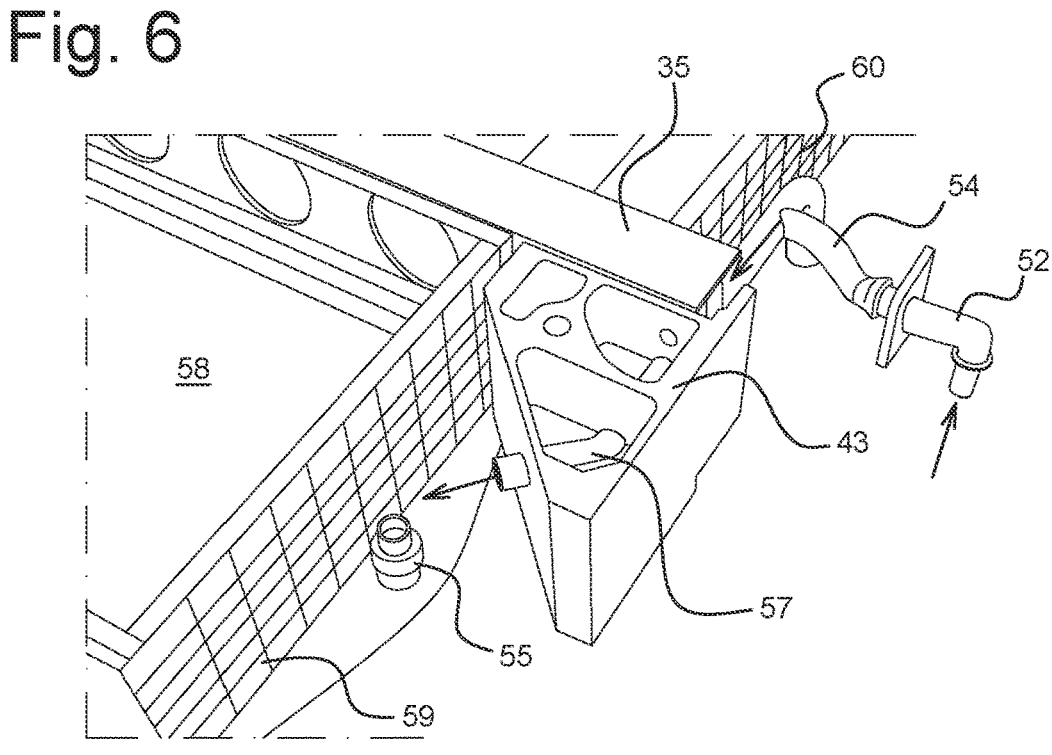
FIG. 6 shows a bracket with integral cooling channel according to the disclosure, shown in FIG. 4.

FIGS. 5 and 6 show an enlarged view of the coolant duct 54 extending between a transverse end plate 60 of the battery module 16 and the inner surface 42 of the front transverse beam 40. The duct 54 branches off from the inlet 52 and extends to the bracket 43, and through the bracket 43 via channel 57 to the coolant inlet 55 of the module 15, from which the battery cells have been omitted from the drawing. The inlet 55 of the module 15 in this embodiment is situated between the transverse end plate 59 and the inner surface 42 of the front transverse beam 40 and is connected to cooling channels in a bottom cooling plate 58, that may be used in combination with, or as an alternative to the top cooling plates 20,21.

Figure 7:
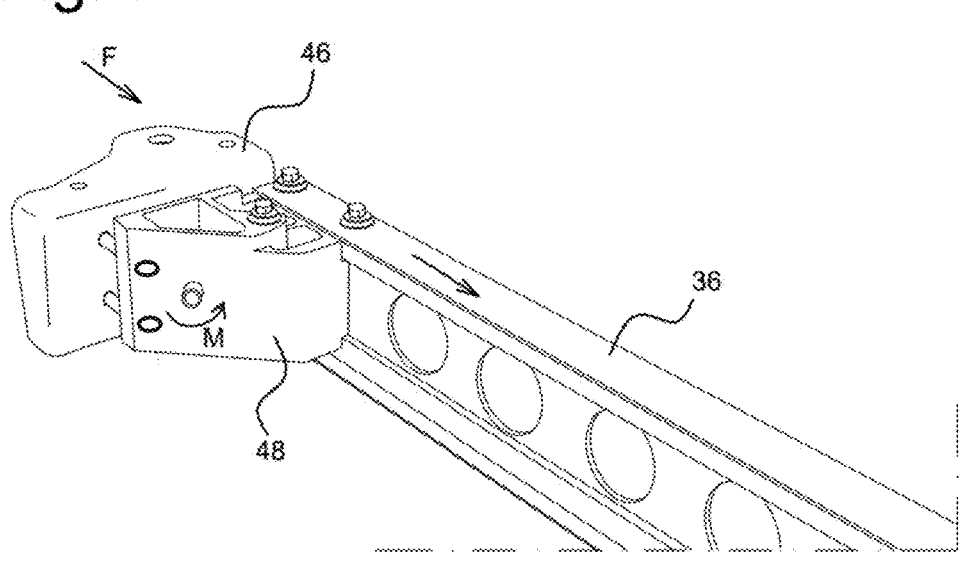
FIG. 7 shows an interconnection member and front frame bracket attached to a bracket according to the disclosure.

FIG. 7 shows a force F that is passed on from the front frame structure 2 via the bracket 46 to the bracket 48 and from there on in the longitudinal direction to the interconnecting member 36. The moment M is taken up by the bracket 48. The front transverse beam 40 has been omitted from the drawing.

Figure 8:
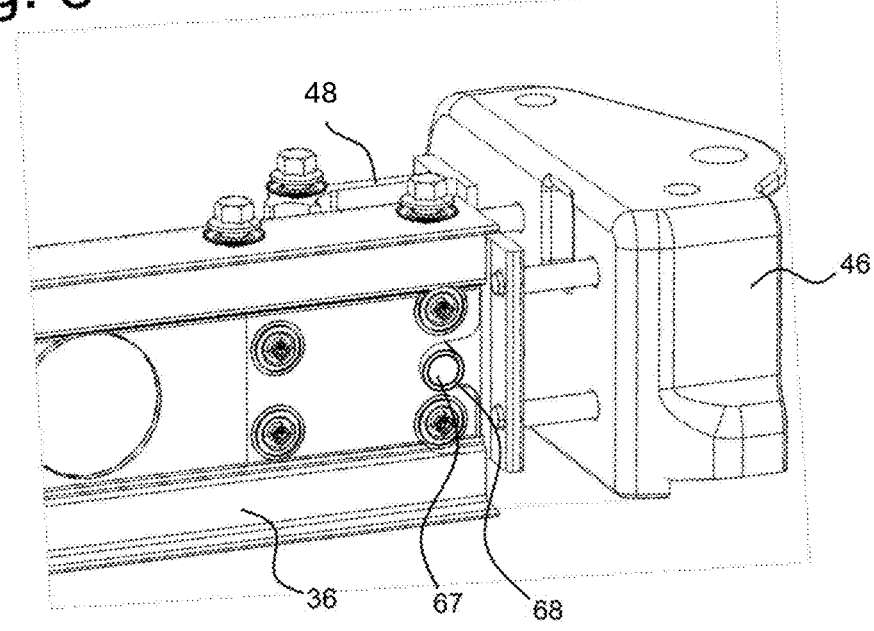
FIG. 8 shows a perspective side view of a detail on an enlarged scale of the interconnection member and bracket of FIG. 7.

FIG. 8 shows a passage 68 provided in the interconnecting structure 36 for the coolant duct 67.

Figure 9:
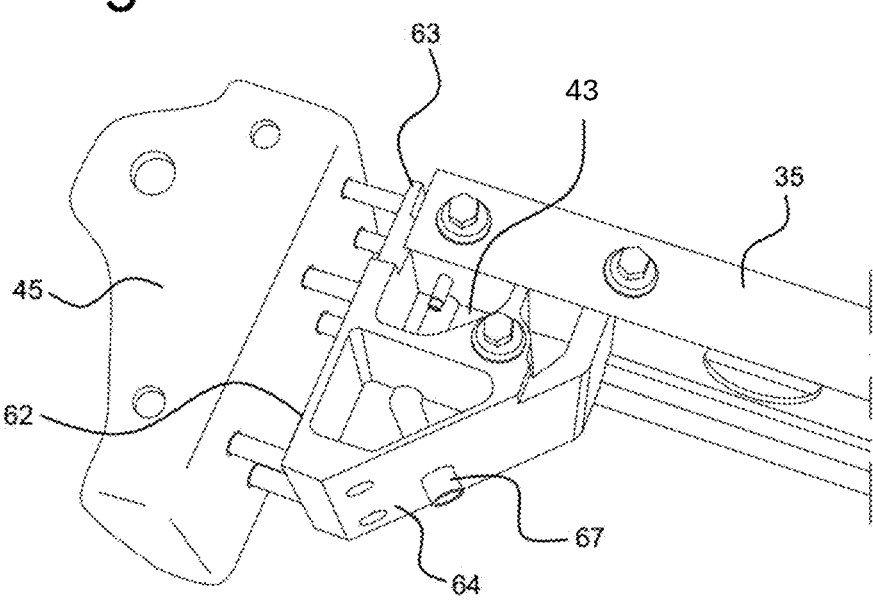
FIG. 9 shows a top view of the interconnection member and bracket of FIG. 7.

FIG. 9 shows the side faces 62,63 of the bracket 43 being connected via the front transverse beam 40 (not shown) to the bracket 45 of the front frame structure 2 and to the interconnecting member 35, respectively. The slanting face 64 of the bracket 43 faces the inlet 56 and to which the coolant duct 67 connects.

Figure 10:
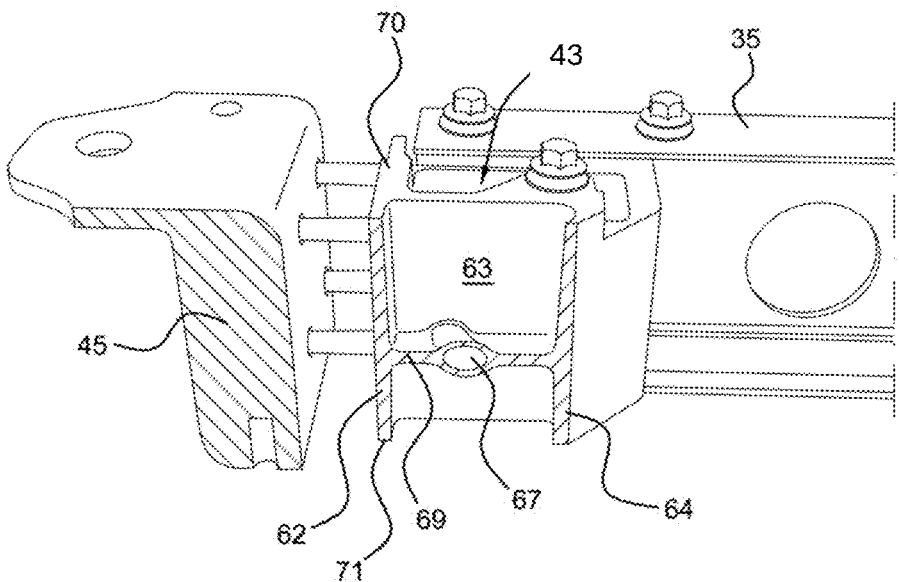
FIG. 10 shows a vertical cross-sectional view through the brackets of FIG. 7.

FIG. 10 shows a shear plane 69 of the bracket 43, defining the coolant duct 67 and extending between the top plane 70 and bottom plane 71 of the bracket 43, interconnecting side face 62 and slanting face 64.

The invention claimed is:

1. A battery assembly for an electric vehicle, the battery assembly comprising two spaced-apart longitudinal profiles extending in a length direction L, interconnected to a front and a rear transverse beam, at least three beam shaped battery modules, at least a pair of the at least three battery modules interconnected along their adjacent longitudinal sides via a plate-shaped interconnecting member, the interconnecting member extending in the length direction and being attached to an inner surface of the front transverse beam via a bracket, > each battery module comprising cooling channels extending in the length direction L and having an inlet situated between a transverse end face of the battery module and the inner surface of the front transverse beam,
>
> a coolant inlet duct extending from an external side of the front transverse beam in a central area situated adjacent to the bracket, for connecting to a coolant inlet of one battery module of the at least three battery modules,
>
> connecting areas on the external side of the front transverse beam for attaching to a front frame part being situated adjacent to the central area, opposite the bracket, and
>
> a branching duct extending between a front transverse side of the one battery module to an inlet that is situated between the transverse end faces and the front transverse beam via a channel through the bracket,
>
> wherein the bracket is of substantially triangular cross-section with two side faces adjacent the interconnecting member and the front transverse beam and a slanting face.

2. The battery assembly according to claim 1, wherein the channel is integrally formed in the material of the bracket by casting or machining.

3. The battery assembly according to claim 1, wherein the bracket is of the substantially triangular cross-section with two rectangular side faces adjacent the interconnecting member and the front transverse beam and the slanting face, comprising an upper and a lower transverse surface, the channel extending in a transverse plane attached to the side faces and the slanting face situated between the upper and lower transverse surface.

4. The battery assembly according to claim 3, the bracket in the side face adjacent the front transverse beam being provided with connecting passages for receiving connector pins of the front frame part, extending through the front transverse beam.

5. The battery assembly according to claim 4, wherein the interconnecting member is at its front end provided with a pass-through opening for a coolant channel, and attached via connector members extending through the interconnecting member, through passages in the side face of the bracket facing the interconnecting member.

6. An electric vehicle comprising a battery assembly, the battery assembly comprising two spaced-apart longitudinal profiles extending in a length direction L, interconnected to a front and a rear transverse beam, at least three beam shaped battery modules, at least a pair of the at least three battery modules interconnected along their adjacent longitudinal sides via a plate-shaped interconnecting member, the interconnecting member extending in the length direction and being attached to an inner surface of the front transverse beam via a bracket, > each battery module comprising cooling channels extending in the length direction L and having an inlet situated between a transverse end face of the battery module and the inner surface of the front transverse beam,
>
> a coolant inlet duct extending from an external side of the front transverse beam in a central area situated adjacent to the bracket, for connecting to a coolant inlet of one battery module of the at least three battery modules,
>
> connecting areas on the external side of the front transverse beam for attaching to a front frame part being situated adjacent to the central area, opposite the bracket, and
>
> a branching duct extending between a front transverse side of the one battery module to an inlet that is situated between the transverse end faces and the front transverse beam via a channel through the bracket,
>
> wherein the bracket is of substantially triangular cross-section with two side faces adjacent the interconnecting member and the front transverse beam and a slanting face.

7. The electric vehicle according to claim 6, wherein the channel is integrally formed in the material of the bracket by casting or machining.

8. The electric vehicle according to claim 6, wherein the bracket is of the substantially triangular cross-section with two rectangular side faces adjacent the interconnecting member and the front transverse beam and the slanting face, comprising an upper and a lower transverse surface, the channel extending in a transverse plane attached to the side faces and the slanting face situated between the upper and lower transverse surface.

9. The electric vehicle according to claim 6, the bracket in the side face adjacent the front transverse beam being provided with connecting passages for receiving connector pins of the front frame part, extending through the front transverse beam.

10. The electric vehicle according to claim 9, wherein the interconnecting member is at its front end provided with a pass-through opening for a coolant channel, and attached via connector members extending through the interconnecting member, through passages in the side face of the bracket facing the interconnecting member.

11. A battery assembly for an electric vehicle, the battery assembly comprising two spaced-apart longitudinal profiles extending in a length direction L, interconnected to a front and a rear transverse beam, at least a pair of beam shaped battery modules comprising a central battery module and a side battery module interconnected along their adjacent longitudinal sides via a plate-shaped interconnecting member, the interconnecting member extending in the length direction L and being attached to an inner surface of the front transverse beam via a bracket, > each battery module comprising a cooling channel extending in the length direction L and having an inlet situated between a transverse end face of the battery module and the inner surface of the front transverse beam,
>
> a coolant inlet duct extending from an external side of the front transverse beam in a central area situated adjacent to the bracket, for connecting to a coolant inlet of the central battery module, connecting areas on the external side of the front transverse beam for attaching to a front frame part being situated adjacent to the central area, opposite the bracket, and a branching duct extending between a front transverse side of the central battery module to an inlet that is situated between the transverse end face of the side battery module and the front transverse beam via a channel through the bracket, wherein the bracket is of substantially triangular cross-section with two side faces adjacent the interconnecting member and the front transverse beam and a slanting face.

12. The battery assembly according to claim 11, wherein the channel is integrally formed in the material of the bracket by casting or machining.

13. The battery assembly according to claim 11, wherein the bracket is of the substantially triangular cross-section with two rectangular side faces adjacent the interconnecting member and the front transverse beam and the slanting face, comprising an upper and a lower transverse surface, the channel extending in a transverse plane attached to the side faces and the slanting face situated between the upper and lower transverse surface.

14. The battery assembly according to claim 13, the bracket in the side face adjacent the front transverse beam being provided with connecting passages for receiving connector pins of the front frame part, extending through the front transverse beam.

15. The battery assembly according to claim 14, wherein the interconnecting member is at its front end provided with a pass-through opening for a coolant channel, and attached via connector members extending through the interconnecting member, through passages in the side face of the bracket facing the interconnecting member.

\* \* \* \* \*